Patented Nov. 29, 1932

1,889,366

UNITED STATES PATENT OFFICE

WILLIAM C. McGOWAN, OF CINCINNATI, OHIO, ASSIGNOR, BY MESNE ASSIGNMENTS, TO MILNESIA LABORATORIES, INC., OF NEW YORK, N. Y., A CORPORATION OF DELAWARE

MAGNESIUM HYDRATE TABLETS AND PROCESS OF MAKING THE SAME

No Drawing.    Application filed May 3, 1928. Serial No. 274,970.

My invention relates to tablets made of magnesium hydrate, and process of producing the same in an advantageous manner, the tablets being of such a character that they may be taken internally with results that are superior to those obtainable in the case of the use of liquid milk of magnesia.

The object of my invention is to provide magnesium hydrate tablets which, when taken into the mouth, will disintegrate immediately, forming a smooth product which, thus, acts at once upon the liquids with which it comes in contact, in the most effective manner, both in the mouth and in the stomach. In other words, the object is to produce a product of this kind which, although taken in tablet form, will have an efficacy, chemically and therapeutically, that is equal to or superior to that obtainable in the case of liquid milk of magnesia, while at the same time the unpleasantness and inconvenience of taking milk of magnesia are obviated. My process involves the working up of the magnesium hydrate, together with any other ingredients required to be present in the completed tablets, into granulated form while still moist, after which the granulated magnesium hydrate is made into tablet form. This avoids any grittiness, which would be readily noticeable in dissolving the tablet in the mouth, and provides a tablet of the utmost smoothness and uniformity, which is very readily disintegrable in the mouth. This tablet gives a sensation of smoothness when being dissolved in the mouth, which is different from the action of any other magnesium tablets hitherto produced. This smoothness of texture of the tablet, when dissolved in the mouth, results in the constituent being more readily miscible with and more effectively acted on by the stomach contents than in the case of previous tablets and, accordingly, enables the ingredients to more readily relieve the conditions of the stomach intended to be relieved by milk of magnesia. Also, inasmuch as the tablet is allowed to disintegrate in the mouth instead of, as in the case of milk of magnesia, being taken directly into the stomach, the constituents of the tablet more readily remove the acidity of the mouth. Furthermore, tablets made in accordance with my invention will continue in their original non-gritty state, and without substantial alteration physically or chemically, under the various different atmospheric conditions. Also, my process of manufacture avoids the necessity of applying any heat at high temperatures and, furthermore, eliminates the use of alcohol, which, hitherto, has been found necessary in the granulation of the compositions of this kind, and which has been found to be an expensive operation in the manufacture of tablets. Also, the resultant product is pleasant to take, both as to taste and otherwise, which is not the case in taking magnesium compounds in liquid form.

While my invention is capable of being carried out in many different ways, for the purpose of illustration I shall describe only certain ways of carrying out the same hereinafter.

For example, I first hydrate magnesium oxide by adding to 250 lbs. of magnesium oxide 200 gals. of water and allow the same to stand for a period of 48 hours at a temperature of 75° F. The excess water is then decantered and, as a result, there remains a moist magnesium hydrate $Mg(OH)_2$ containing 362 lbs. of magnesium hydrate and 178 lbs. of water. To 250 lbs. of the moist magnesium hydrate and which, as above indicated, contains 67% by weight of magnesium hydrate and 33% by weight of water, I add 318 lbs. and 4 ozs. of calcium carbonate, preferably freshly precipitated, as a filler or diluent. To this I add 6 ozs. and 392 grains of saccharin as a sweeting agent. If desired, I may add 68 lbs. 4 ozs. of starch as an additional diluent or filler. To these ingredients there is added a very small amount of a 12% solution, in water, of an adhesive, such, for example, as gum acacia. The ingredients are then thoroughly intermingled in any desired type of mixing apparatus, and the composition is granulated by putting it through a sieve having 5 meshes to the inch, a flavoring material, such, for example, as methyl salicylate, being sprayed over the mixture while being granulated. The granulated composition is then allowed to dry in the atmosphere, but preferably in the warm dry air of a room heated to about 100° F. However, it is to be understood that the drying may take place, if desired, in an unheated room. The granulated composition is thereupon put through a tablet-making machine of any desired character, while taking the usual precautions in regard to lubrication of the tablets, etc. In the above composition other diluents may be used instead of one or both of the diluents above referred to, as, for example, sugar of milk. Also, other flavoring materials may be used, if desired. If desired, furthermore, there may be added to the composition magnesium oxide or magnesium carbonate in substitution for a part of the magnesium hydrate, although, according to the extent added, these constituents will detract somewhat from the complete smoothness of the tablets.

These tablets, as above described, not only have the complete smoothness referred to, but will retain the characteristics mentioned for an indefinite period of time. The smoothness attained may be due to the fact that magnesium hydrate becomes changed partly into a carbonate when the magnesium hydrate comes into contact with carbon dioxide, so that in my process the gritty magnesium carbonate is prevented from forming owing to the fact that the magnesium hydrate, while still fresh, is protected by the presence of moisture until intermingled with the diluents and gum as a binder present, which latter then serve to further protect the magnesium hydrate from becoming changed into the carbonate. In other words, it may be that the avoidance of the grittiness is brought about by the effective protection of the magnesium hydrate from the time of its formation until it becomes incorporated in the tablets, in which the particles are embedded in the diluents accompanied by the gum binder.

While I have described my invention above in detail I wish it to be understood that many changes may be made therein without departing from the spirit of the same.

I claim:

1. The process which comprises hydrating magnesium oxide to form water moist magnesium hydrate and granulating the magnesium hydrate while still water moist after having been mixed with a diluent and a binder.

2. The process which comprises hydrating magnesium oxide to form water moist magnesium hydrate, granulating the magnesium hydrate while still water moist after having been mixed with a diluent and a binder, drying the same, and forming the granulated product into tablets.

3. The process which comprises hydrating magnesium oxide to form water moist magnesium hydrate and granulating the magnesium hydrate while still water moist after having been mixed with calcium carbonate and starch as diluents and a binder.

4. The process which comprises hydrating magnesium oxide to form water moist magnesium hydrate, granulating the magnesium hydrate while still water moist, after having been mixed with calcium carbonate and starch as diluents, and a binder, drying the same, and forming the granulated product into tablets.

5. The process which comprises forming magnesium hydrate, protecting the same from the formation of magnesium carbonate by the presence of water from the time of formation of the magnesium hydrate and by the presence of a diluent and a gummy binder, and granulating the same while still so protected.

In testimony that I claim the foregoing, I have hereunto set my hand this 28th day of April, 1928.

WILLIAM C. McGOWAN.